United States Patent [19]

Chreitzberg et al.

[11] Patent Number: 4,687,718

[45] Date of Patent: Aug. 18, 1987

[54] METHOD OF MAKING A SEALED LEAD-ACID BATTERY WITH A GEL ELECTROLYTE AND SEALED LEAD-ACID STORAGE BATTERY MADE ACCORDING TO THIS METHOD

[75] Inventors: Augustus M. Chreitzberg, Yardley; Frank J. Chiacchio, Bensalem, both of Pa.

[73] Assignee: Exide Corporation, Horsham, Pa.

[21] Appl. No.: 923,104

[22] Filed: Oct. 24, 1986

[51] Int. Cl.$^4$ .................................................. H01M 10/12
[52] U.S. Cl. .................................. 429/190; 29/623.2; 204/2.1
[58] Field of Search ................ 429/190, 204, 225; 29/623.2; 204/2.1

[56] References Cited

U.S. PATENT DOCUMENTS

| | | | |
|---|---|---|---|
| 3,172,782 | 3/1965 | Jache | 429/190 X |
| 3,257,237 | 6/1966 | Jache | 429/54 |
| 3,271,199 | 9/1966 | Beste et al. | 429/190 |
| 3,305,396 | 2/1967 | Rauter | 429/225 X |
| 3,328,208 | 6/1967 | Ryhlaer | 429/190 X |
| 3,402,077 | 9/1968 | Kida et al. | 429/190 X |
| 3,408,233 | 10/1968 | Parker et al. | 429/118 |
| 3,457,112 | 7/1969 | Reber | 429/190 X |
| 3,540,939 | 11/1970 | Badger et al. | 429/190 X |
| 3,576,674 | 4/1971 | Ruben | 429/204 |
| 3,711,332 | 1/1973 | Bastacky | 429/190 X |
| 3,765,942 | 10/1973 | Jache | 429/190 |
| 3,776,779 | 12/1973 | Johnson | 429/190 |
| 4,150,199 | 4/1979 | Tuphorn et al. | 429/118 |
| 4,262,068 | 4/1981 | Kono et al. | 429/204 |
| 4,391,036 | 7/1983 | Kishimoto et al. | 429/190 X |
| 4,414,302 | 11/1983 | Jache et al. | 429/190 |

*Primary Examiner*—Anthony Skapars
*Attorney, Agent, or Firm*—Woodcock, Washburn, Kurtz, Mackiewicz & Norris

[57] ABSTRACT

A method of making a sealed lead-acid storage battery having a plurality of electrodes and a gel electrolyte consisting substantially of sulfuric acid and a gelling agent wherein the gelling is accomplished on the formation charge in the battery jar, is applicable to dry uncharged cells, and no conditioning charge and discharge is needed.

7 Claims, No Drawings

4,687,718

METHOD OF MAKING A SEALED LEAD-ACID BATTERY WITH A GEL ELECTROLYTE AND SEALED LEAD-ACID STORAGE BATTERY MADE ACCORDING TO THIS METHOD

FIELD OF THE INVENTION

This invention relates to a method of making a sealed lead-acid storage battery having a plurality of electrodes and a gel electrolyte consisting substantially of sulfuric acid and a gelling agent and a sealed lead-acid storage battery made according to this method. The present invention is not only applicable to the manufacture of pasted Faure type flat plates for lead-acid batteries but is also applicable to the manufacture of lead-acid batteries with tubular type plates or combinations of tubular type plates and flat plates.

BACKGROUND OF THE INVENTION

Various methods of making lead acid storage batteries with a gelled electrolyte have heretofore been proposed. For example in U.S. Pat. No. 3,765,942 there is disclosed a lead acid battery in which each electrode is wrapped in a web of fiberglass and the gel electrolyte consists of a mixture of sulfuric acid and phosphoric acid and silicon dioxide as the gelling agent. The electrodes are charged and dried, then wrapped in the fiber web and assembled into the battery housing after which the gel electrolyte is introduced into the housing under vacuum and the housing is ventilated.

Other methods of gelling of lead-acid cells are disclosed in U.S. Pat. No. 4,414,302. The process described in this patent is applicable to either wet discharged electrodes or dry discharged electrodes. In one example the cell was made operative in accordance with the prior art by filling with dilute sulfuric acid and subsequent charging. In this example it was stated to be immaterial whether for setting into operation the cell was equipped with plates already charged in dry state or with non-activated plates so that the setting into operation constitutes the activation of the plates within the cell box. The cell was then discharged with the 20-hour current $I_{20} = 12.5$ A down to a consumption of 250 Ah. to decrease the acid density to a final value of 1.06 specific gravity. The amount of sulfuric acid corresponding to the withdrawn capacity is electrochemically bonded in the electrodes in the form of lead sulfate which is now inactive with respect to the gel formation. When the discharging is completed, the electrolyte moves freely within the cell and is removed therefrom by dumping. A suitable gelling agent such as finely dispersed silicon dioxide (AEROSIL 200) was added to the electrolyte removed from the cell. To improve the cycle life, phosphoric acid may further be added to the electrolyte removed from the cell. This mixture of electrolyte and gelling agent was subsequently filled into the cells of the lead acid storage battery as filler electrolyte. The plates in the storage battery were then recharged whereby the gel formation in the electrolyte was effected as the result of increasing sulfuric acid concentration formed by the recharge. After completion of the recharge, the sulfuric acid concentration in the electrolyte was obtained which corresponded to the working acid density of the storage battery. In the second example the cell was equipped with dry, discharged electrodes. The setting into operation took place directly by means of an electrolyte already containing silicon dioxide and acid and subsequent recharging of the electrodes.

While the foregoing methods have proved to be satisfactory, it will be noted that such methods require charging the element assembly on the plates twice. It is an object of the present invention to provide a process for gelling lead-acid storage batteries wherein no discharge is needed and no recharge is needed. By gelling on the formation charge it is only necessary to charge the element assembly on the plates once rather than twice, thus resulting in a saving of time.

SUMMARY OF THE INVENTION

According to the present invention there is provided a method for making a sealed lead acid storage battery having a plurality of electrodes and a gel electrolyte consisting substantially of sulfuric acid and a gelling agent, comprising the steps of activating a dry unformed battery by filling the battery with sulfuric acid, maintaining the battery on open circuit for a period of time sufficient to chemically bond sulphuric acid as sulfate to the electrodes and lower the specific gravity of the acid to the desired gelling value, dumping the free acid from the battery, adding a solution of gelling agent and sulfuric acid to fill the battery to the normal formation level, and finally formation charging the battery by applying a constant charge current of 5-16A/100 Ah for an input of 200-300 Ah/lb. positive activate material whereby gelling of the electrolyte is effected, when formation is complete, removing excess liquid, if any, to top of electrodes, and sealing the battery with a pressure relief valve. The unformed battery is activated by filling the battery with sulfuric acid having a specific gravity of 1.24-1.28 and the electrodes sulfate for 4-8 hrs. until the specific gravity of the acid drops to 1.06 -1.15. After dumping the free acid from the battery, the battery is refilled with a solution of 1.06 -1.20 Sp. Gr. sulfuric acid containing 4-10% fumed $SiO_2$ by weight.

It is a further object of the invention to provide a sealed lead-acid storage battery with a gel electrolyte which consists substantially of sulfuric acid and a gelling agent made in accordance with the above described method.

DESCRIPTION OF THE PREFERRED EMBODIMENT

The present invention provides an improved gelling process for sealed lead-acid battery electrolyte wherein the gelling is accomplished on the formation charge. In accordance with this process the cells of a dry unformed battery are activated by filling the battery with sulfuric acid having a 1.20-1.28 specific gravity. The battery is maintained on open circuit for approximately 4-8 hrs. to sulfate the electrodes and lower the specific gravity to about 1.06-1.15. At this time the free acid which is now hot from exothermic sulfation reaction is dumped and replaced by a solution of a gelling agent and sulfuric acid to the normal preformation level. This solution can be the hot dumped acid adjusted to specific gravity of 1.07-1.15 and having stirred into it a gelling agent of 4-10% $SiO_2$ by weight. The battery is thereafter formation charged by applying a constant charge current of 5-16 A/100 Ah for an input of 200-300 Ah/lb. positive active material. As the gravity of the acid increases with charge input gelling of the $SiO_2$ occurs at sites where $H_2SO_4$ concentration is increased most rapidly. Normal formation charge gassing stirs the gelling solution and the increasing acidity ultimately gels the entire mass of acid between the plates and separators and between the jar walls and element assembly of the battery. When formation is complete the excess liquid, if any, is removed down to the top of the plates and the battery is thereafter sealed with a pressure relief valve.

EXAMPLE I

In this example the in-situ gelling process of the present invention was applied to a sealed lead-acid storage battery having tubular positive plate cells. The cell type was an RT 140 (E-31) manufactured by Exide Corporation. The unformed dry cells were filled with 1.270 Sp. Gr. sulfuric acid and maintained on open circuit for a period no longer than 8 hours to sulfate the plates. 1 Water spray cooling may be necessary in larger size cells. When the specific gravity falls to the desired gelling value (1.06–1.09), the free acid is dumped from the battery. The fall of the specific gravity to the desired gelling value normally takes about 8 hours. A gelling solution consisting of 1.080 Sp. Gr sulfuric acid containing 0.065 g $SiO_2$ per cc of acid (246 g $SiO_2$ per gallon of acid) is quickly added to fill the cell to the normal formation level. A charge current is then turned on and the battery charged at a constant current of 5 A per 100 Ah of 5 h ready capacity for an input of 250 Ah per lb. positive active material (2.5×theoretical positive capacity). The final acid gravity was 1.290 Sp. Gr. sulfuric acid containing 4.8% by weight fumed silica at the top-of-charge.

Sealed lead-acid cells made in accordance with the above example were cycled at the 5 h discharge rate to 100% depth-of-discharge and compared with lead-acid cells having a gel electrolyte made in accordance with U.S. Pat. No. 4,414,302. After four cycles the cells were demonstrating the same capacity. After approximately 10 discharge cycles, the cells were cycled to 40% depth-of-discharge, 3 cycles per day, simulating a commercial application. From cycle 10 to cycle 600 the end of discharge voltage of the cells gelled during formation were not significantly different from those gelled by the method in U.S. Pat. No. 4,414,302. The present process of in-situ gelling of sealed lead-acid batteries is applicable to dry uncharged cells and jar formation. No conditioning discharge and recharge is needed.

The fumed silica ($SiO_2$) used in the present process has a surface area of 200 ±25 $m^2$/g, a particle size of 12 millimicrons and specific gravity of 2.2–2.3. It is available commercially from De Gussa Corporation as Aerosil 200 at a density of 40 g/l or as Aerosil 200 Vs at a density of 100 g/l. These two products are alike except for compacted apparent density. Similar fumed silica is also available commercially from Cabot Corporation.

What is claimed is:

1. A method of making a sealed lead-acid storage battery having a plurality of electrodes and a gel electrolyte consisting substantially of sulfuric acid and a gelling agent, comprising the steps of:
    (a) activating a dry unformed battery by filling the battery with sulfuric acid,
    (b) maintaining the battery on open circuit for a period of time sufficient to chemically bond sulphuric acid as sulfate to the electrodes and lower the specific gravity of the acid to the desired gelling value,
    (c) dumping the free acid from the battery,
    (d) adding a solution of gelling agent and sulfuric acid to fill the battery to the normal formation level,
    (e) formation charging the battery by applying a constant charge current of 5–16 A/100 Ah for an input of 200–300 Ah/lb. positive active material whereby gelling of the electrolyte is effected,
    (f) when formation is complete, removing excess liquid, if any, to top of electrodes, and
    (g) sealing the battery with a pressure relief valve.

2. A method of making a sealed lead-acid storage battery according to claim 1 wherein the unformed battery is activated by filling the battery with sulfuric acid having a specific gravity of 1.24–1.28.

3. A method of making a sealed lead-acid storage battery according to claim 2 wherein the electrodes sulfate for 4–8 hours until the specific gravity of the acid drops to 1.06–1.15.

4. A method of making a sealed lead-acid storage battery according to claim 1 wherein said gelling agent comprises fumed $SiO_2$.

5. A method of making a sealed lead-acid storage battery according to claim 4, wherein after dumping the free acid from the battery, the battery is refilled with a solution of 1.06–1.20 Sp. Gr. sulfuric acid containing 4–10% $SiO_2$ by weight.

6. A sealed lead-acid storage battery with a gel electrolyte which consists substantially of sulfuric acid and a gelling agent made in accordance with the method of claim 1.

7. A sealed lead-acid storage battery with a gel electrolyte which consists substantially of sulfuric acid and a gelling agent made in accordance with the method of claim 1 wherein the formation charge consists of an initial constant current of 5–16 A/100 Ah until the cell voltage rises to a preset maximum voltage in the range 2.30 –2.45 v/cell, wherein the current is allowed to decay to a finishing rate of 5–10 A/100 Ah, and its formation is then completed at this constant finishing rate for a total charge input of 200–300 Ah/lb. positive active material.

* * * * *